No. 614,415. Patented Nov. 15, 1898.
S. L. ALLEN.
HILL DROPPER.
(Application filed Sept. 12, 1895.)
(No Model.)
5 Sheets—Sheet 3.

WITNESSES
a. N. Flannery
Geo. a. Holmes

INVENTOR
Samuel L. Allen
by Wm. B. H. Dows
Atty.

No. 614,415. Patented Nov. 15, 1898.
S. L. ALLEN.
HILL DROPPER.
(Application filed Sept. 12, 1895.)
(No Model.) 5 Sheets—Sheet 4.
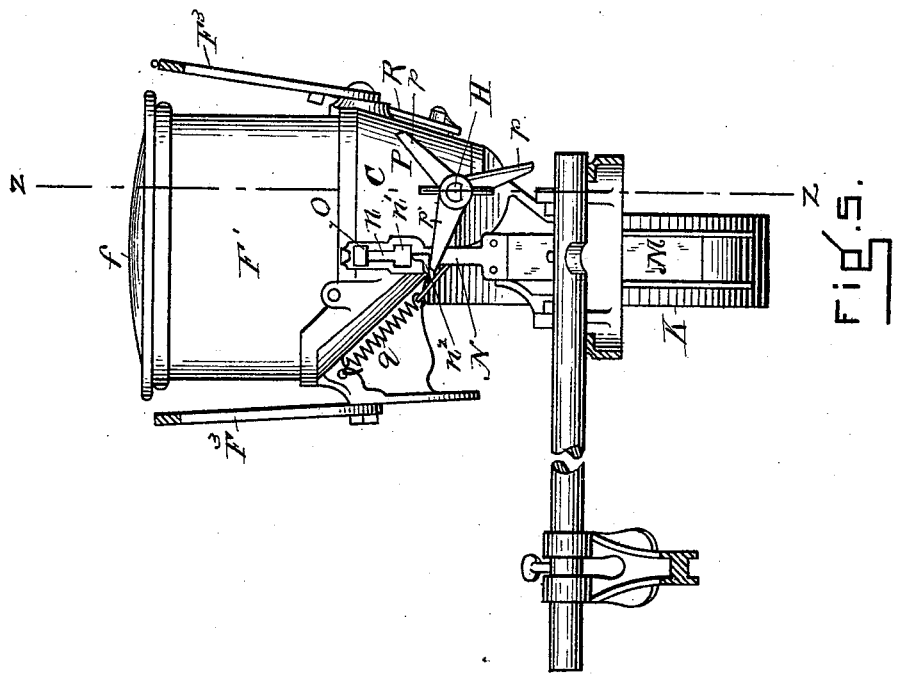
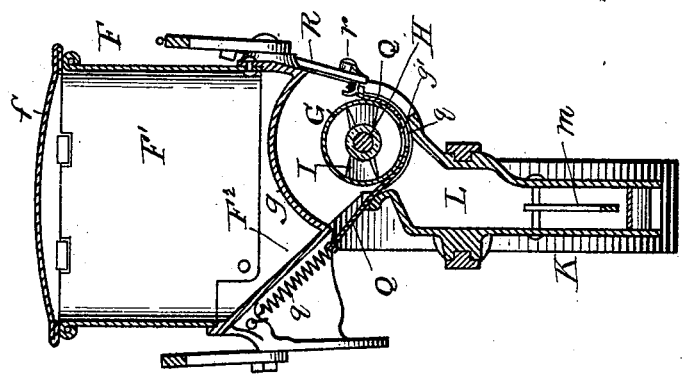
WITNESSES
INVENTOR No. 614,415. Patented Nov. 15, 1898.
S. L. ALLEN.
HILL DROPPER.
(Application filed Sept. 12, 1895.)
(No Model.) 5 Sheets—Sheet 5.

WITNESSES.
A. H. Flannery
Geo. A. Holmes

INVENTOR.
Samuel L. Allen
by Wm. B. H. Dowse
Atty.

THE NORRIS PETERS CO., PHOTO-LITHO., WASHINGTON, D. C.

UNITED STATES PATENT OFFICE.

SAMUEL L. ALLEN, OF MOORESTOWN, NEW JERSEY.

HILL-DROPPER.

SPECIFICATION forming part of Letters Patent No. 614,415, dated November 15, 1898.

Application filed September 12, 1895. Serial No. 562,290. (No model.)

*To all whom it may concern:*

Be it known that I, SAMUEL L. ALLEN, a citizen of Moorestown, in the county of Burlington and State of New Jersey, have invented certain new and useful Improvements in Hill-Droppers, of which the following is a full specification, reference being had to the accompanying drawings, wherein like letters represent like parts.

Figure 1:
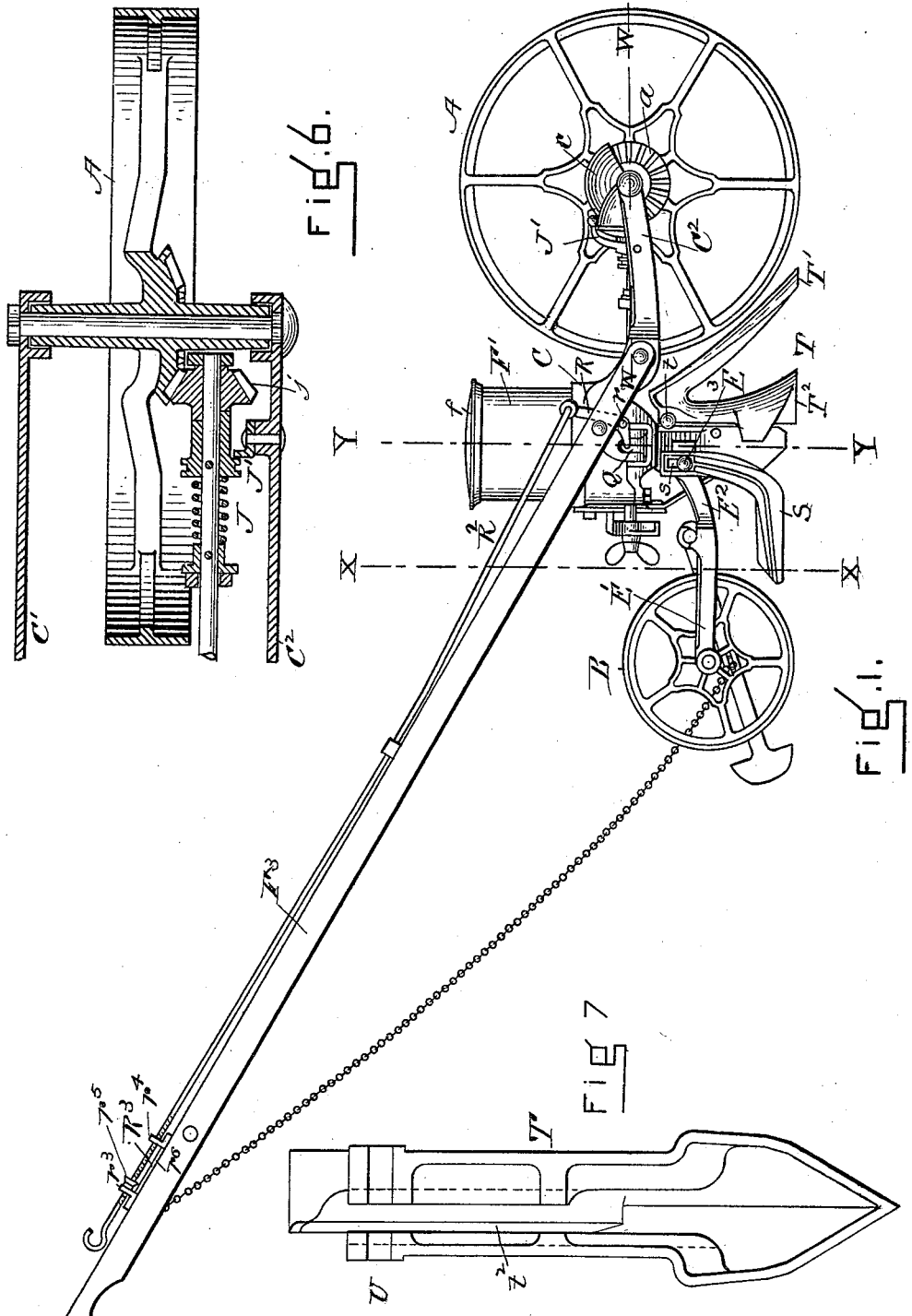
Figure 2:
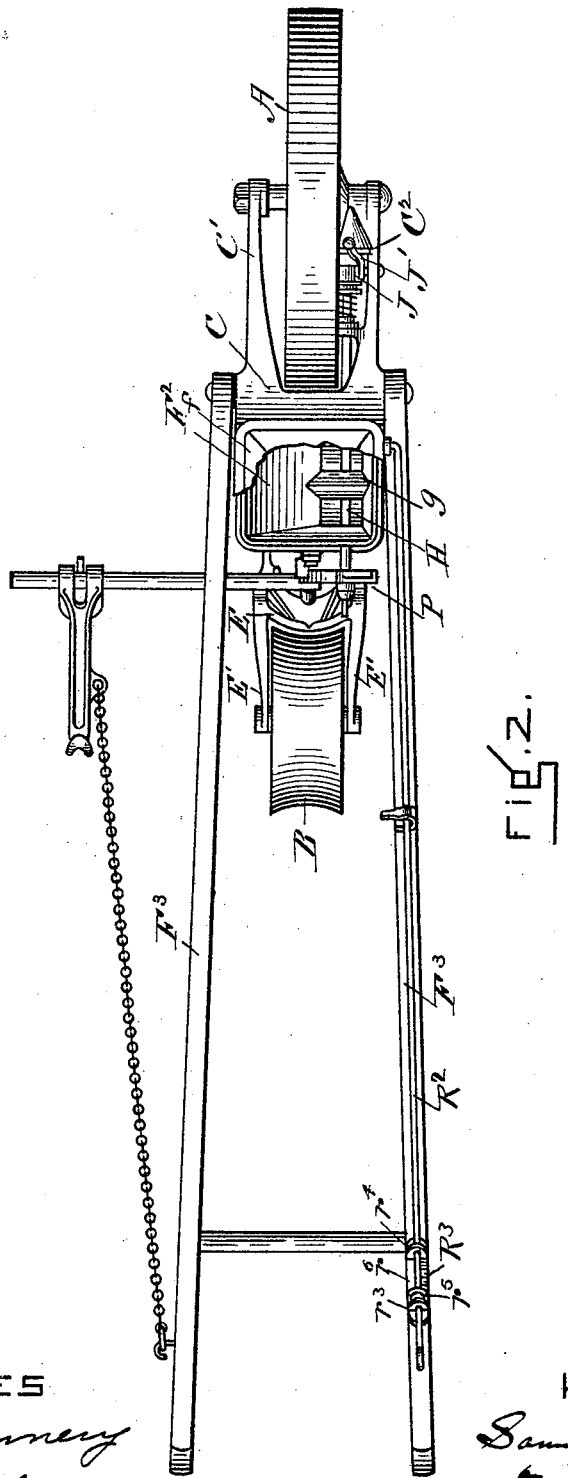
Figure 3:
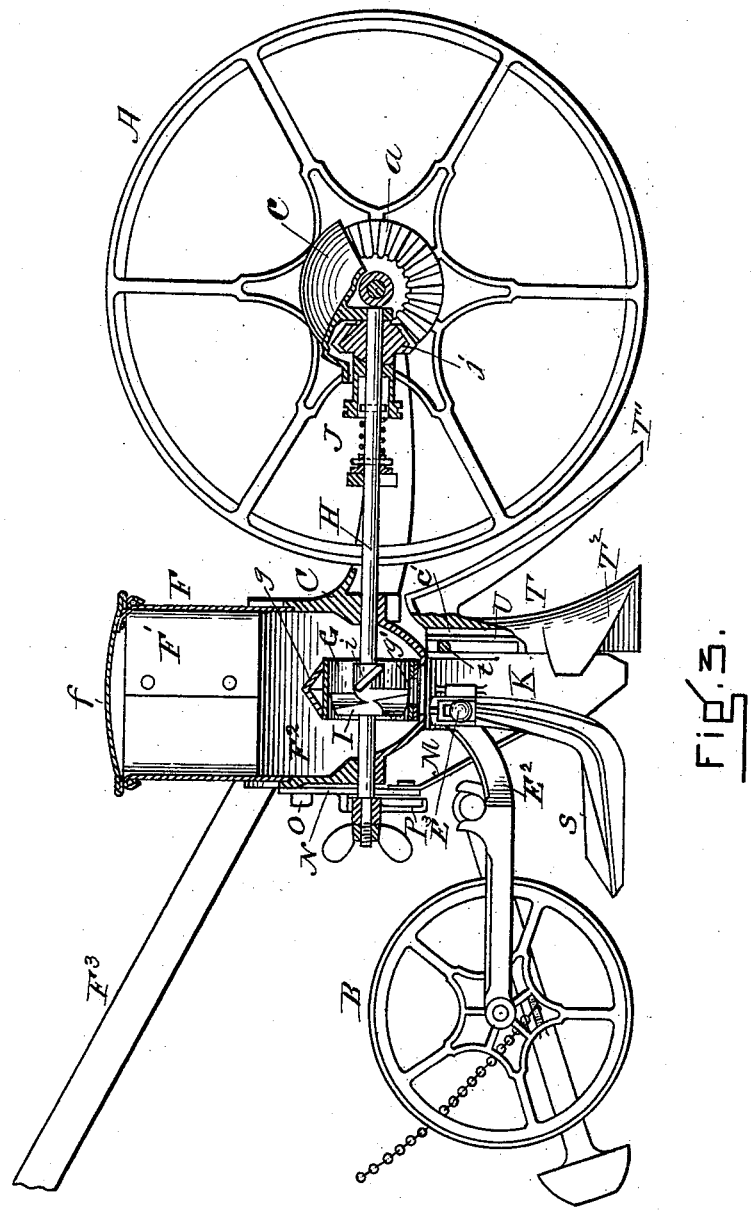
Figure 12:
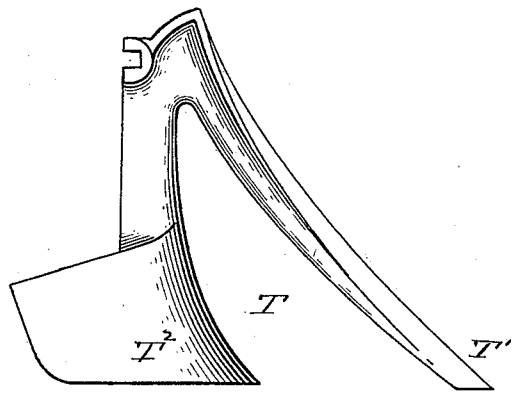
Figure 8:
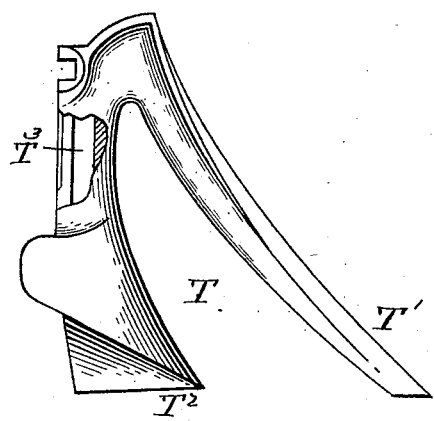
Figure 10:
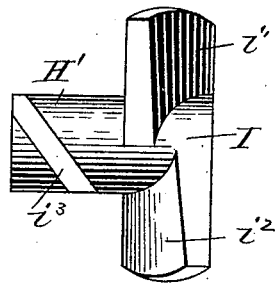
Figure 9:
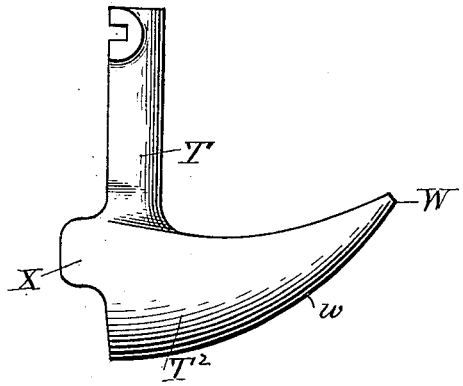
Figure 11:
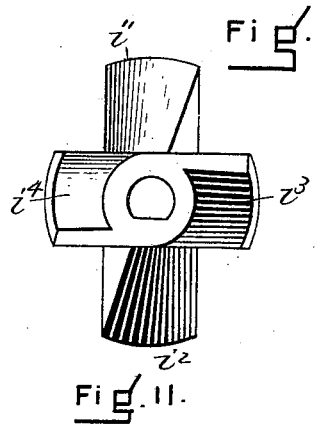

In the drawings, Figure 1 is a side elevation of my improved hill-dropper. Fig. 2 is a plan of same. Fig. 3 is a vertical longitudinal section through the line Z Z, Fig. 5. Fig. 4 is a vertical cross-section through the hopper on the line Y Y, Fig. 1. Fig. 5 is a vertical cross-section on the line X X, Fig. 1, showing a rear elevation of the hopper. Fig. 6 is a horizontal section through the front wheel on the line W W, Fig. 1. Fig. 7 is an enlarged rear elevation of my improved plow. Fig. 8 is an enlarged side elevation of same. Figs. 9 and 12 are modified forms of same. Figs. 10 and 11 show, respectively, an enlarged side and end elevation of my paddle-wheel.

My invention relates to seed-planters; and it consists of an improved hill-dropper, of which special features of construction are hereinafter set forth.

In my improved hill-dropper the seed to be sown is contained in a hopper or receptacle which is provided with means for automatically delivering the necessary amount of said seed and depositing it in furrows automatically opened in advance by the implement as it moves along and afterward covered and rolled down. The implement is also provided with devices for readily controlling the amount of seed delivered in a given time and for adjusting the size of the delivery-openings to seed of many varieties.

My hill-dropper runs upon two wheels—the front or driving wheel A and the rear wheel or roller B. The frame of my machine is a casting C, which has in front the two arms $C'$ $C^2$, which carry the driving-wheel A between them. To the rear end of the machine C is bolted the bracket E, having the rearwardly-projecting arms $E'$ $E'$, which carry between them the roller B. To the sides of the casting C are bolted the upwardly and rearwardly extending handles $F^3$, by which the implement is propelled.

The casting C, which forms the frame of the machine, also forms the lower end of the hopper F, which holds the seed to be sown and through the bottom of which it is fed to the furrow beneath. The upper part $F'$ of the hopper F is preferably a sheet-metal box having a cover $f$ and secured to the lower portion $F^2$, formed by the casting C.

The sides and ends of the hopper F at their lower ends slope inwardly, as in an inverted pyramid, and near the bottom the arch $g$, preferably cast in one piece with the hopper, springs across from one side to the other. This arch (shown in section in Figs. 3 and 4 and in plan in Fig. 2) is of conical cross-section with the apex upward and forms a hip-roof cover for the cylindrical paddle-box G, placed in the apex of the hopper F. This cylindrical paddle-box is open at both ends and has running through its axis the longitudinal spindle H, which carries the paddle-wheel I. The paddle-wheel I (shown in Figs. 10 and 11) is preferably made of rubber and consists of four blades $i'$ $i^2$ $i^3$ $i^4$, projecting from and integral with a central hollow spindle $H'$, through which the spindle H passes. These blades are set in pairs, which are at right angles to each other and at each end of the spindle $H'$, and being set obliquely thereon, as shown. When the paddle revolves, the action is similar to that of a propeller-wheel. The blades or paddles $i'$ of the paddle-wheel are preferably constructed of sufficient length to sweep the sides of the cylinder, so that as the paddle-wheel revolves the seed is agitated and forced through the cylinder and over the discharge-aperture $g'$ in its lower side. It will be seen that this paddle could be used also without the cylindrical paddle-box, in which case it would simply turn freely in the apex of the hopper and keep the seed therein in agitation over the discharge-outlet.

As hereinbefore stated, the paddle-wheel is mounted on the spindle H. This spindle turns in bearings on the lower part of the hopper and in the casting C and extends forward, carrying on its forward end the spring-clutch J, keyed to the spindle, and carrying on its end the bevel-gear $j$. This gear $j$ meshes with the bevel-gear $a$, preferably cast in one piece with the wheel A, and forms a portion of the hub thereof.

The spring-clutch J is operated by the handle J', pivoted to the frame C, and by this means the gear $j$ may be made to turn loosely upon the spindle-rod H or revolve with it. When the clutch is thrown out of gear, so that the bevel-gear $j$ turns loosely, the implement may be moved along on its wheels without turning the spindle-rod H. When in gear, the spindle-rod H will revolve continuously as the implement is moved forward and will actuate the paddle I and dropping mechanism, hereinafter described, but will allow the implement to be moved backward without actuating said mechanism.

The gears $a$ and $j$ are protected by the cover $c$, which is preferably cast in one piece with the arm $C^2$ of the casting C. It will thus be seen that by using a frame having in one casting the wheel-supporting arms C' $C^2$, cover $c$, and lower portion of hopper $F^2$ a very rigid and firm construction is obtained, which insures the true running of the spindle-rod H.

To the frame C at the under side of the hopper $F^2$ is secured the casting K, which forms the bottom side of the hopper and the channel for conducting the seed to the furrow. It also serves as a support for holding the furrowing-tools, covering-tools, and roller, as hereinafter described.

Extending downward from the outlet $g'$ in the bottom of the hopper is the channel L. Three sides of this channel are formed by the casting K, while the rear side and bottom are closed by the sliding shutter or cut-off M, which when down (in which position it is held by spring tension) closes the bottom of the channel and rear thereof sufficiently to form a receptacle in which the seed may gather as it falls through the outlet $g'$ in the bottom of the hopper. As shown in Fig. 5, this shutter M extends upward and is secured to the sliding piece N, having the slot $n$, which slides up and down on the lug or bolt O, projecting from the casting C. The piece N may have on its under side a square lug, (not shown,) which slides in a corresponding groove (not shown) on the casting C in order to hold it more accurately in place as it slides up and down. The lug O has an enlarged head, as shown, and the groove $n$ is correspondingly enlarged at $n'$ in order that the slotted piece may be pulled back slightly when in its upper position in order to engage with the said enlarged head, whereby the sliding piece may be held in its upper position, if desired. The end of the shutter M is pivoted by means of the arm $m$, Fig. 4, within the channel and so held firmly in place. When drawn up, the shutter is sprung out of line, and being made of thin spring metal returns by its own elasticity.

The spindle H projects out through the rear side of the hopper F and carries on its end a cam-wheel P, Figs. 3 and 5, having a number of arms $p$, and the sliding piece N has upon it the projection $n^2$, so arranged, as shown in Fig. 5, that as the spindle H and the cam-wheel P revolve the arms $p$ will successively engage with the projection $n^2$ and thus raise the sliding piece N and open the shutter M at the bottom of the channel L for the seed contained therein to escape. The result is that the seed which collects in the bottom of the channel is deposited at regular intervals, the number of times it is deposited during a revolution of the spindle H corresponding to the number of arms $p$ on the cam-wheel P. I preferably provide each machine with a number of interchangeable cam-wheels P, having a different number of arms $p$, each cam-wheel being readily attached to or removed from the spindle H, so that a quantity of seed may be dropped once, twice, three, or any number of times during a revolution of the spindle, causing the seed to fall at different distances along the ground. The seed may be deposited continuously, if desired, by slipping the enlarged portion of the slot $n'$ over the head of the lug O, and thus holding the shutter open permanently, as hereinbefore set forth.

The quantity of seed which collects in the bottom of the channel is regulated by the flexible band or cut-off Q, which passes under the cylindrical paddle-box G in the apex of the hopper and is stretched along the curved under surface of the paddle-box, one end being secured to an end of the spring $q$, while the other end of the spring is attached to the hopper or a connection thereof. The other end of the band Q is carried around up the other side of the hopper and is pivoted to the vertical bell-crank lever R, fulcrumed to the hopper at $r$.

$R^2$ is a rod pivoted to the other arm of the bell-crank lever R, which rod passes up along one of the handle-bars $F^3$ and through the gage or index frame $R^3$, fixed on said handle-bar and near the top thereof, the rod $R^2$ terminating, preferably, in a ring at its upper end. The strap or band Q has an opening $q$ of the same size and shape as the outlet $g'$ in the bottom of the paddle-box G. The amount of seed which sifts through the outlet of the hopper is determined by the relative position of the two openings $q$ and $g'$, which is obviously regulated by the position of the handle-rod $R^2$. The gage or index frame $R^3$ consists of two stops $r^3$ and $r^4$, projecting from a base-plate $r^6$, which is suitably graduated to indicate the amount of opening necessary for seed of different varieties. The handle index-rod $R^2$ passes through the two stops and is threaded for some distance and carries a milled nut $r^5$, which can be so set upon the rod as to enable the operator to start or stop the flow instantly, the stop causing it to be open always at exactly the place at which the thumb-screw is set.

The bracket E, which carries the roller B, has two forwardly-projecting arms $E^2$, which embrace the sides of the casting K. As shown in section in Fig. 4, these arms are dovetailed into the sides of the casting K in order to prevent any vertical movement of the roller, and the bracket is firmly secured by the bolt $E^3$, which passes through both of the arms $E^2$ and the casting K. The bolt $E^3$ also secures the two covering-blades S S, whose upper ends are by it clamped onto the outer sides of the arms. These blades extend downward, inward, and to the rear of the bottom of the seed-channel L in such a manner as to cover the furrow as the implement advances as fast as the seed is deposited. The blades S are capable of vertical adjustment by having the bolt-holes $s$ elongated vertically, but may be restrained from any backward or forward play by means of horizontal serrations (not shown) on their inner sides, which engage with corresponding projections on the outside of the arms $E^2$. It will thus be seen that by turning a single nut on the end of the bolt $E^3$ the bracket E and covering-blades S S are held firmly in position or readily removed.

T is the plow, which breaks the ground and forms a furrow for the seed. It consists of two teeth cast in one piece, the forward tooth T' and the rear or furrowing tooth $T^2$. The plow is secured to the casting K, directly in front of the seed-channel L, by means of a dovetail $T^3$, a vertical web $c'$ on the casting K engaging with a corresponding groove on the rear side of the plow. A bolt $t$, passing through the dovetail, holds the plow in place, and vertical adjustment for different depth of furrow is obtained by elongating vertically the bolt-hole in the web. One side of the groove in the plow is slitted vertically at $t^2$, Fig. 7, in order that the two sides of the groove may be clamped firmly to the web $c'$ by tightening the bolt $t$.

Fig. 9 shows a modified form of plow, which is a special plow for soft pebbly soils. It will be seen from the drawings that there is no forward breaking-tooth, while the furrowing-tooth $T^2$ is turned up at its forward end W and its sides rounded under, so as to form a sharp curved edge $w$ on the under side. Thus as the implement advances a furrow is pressed in the soil rather than opened, and being sharp on the under edge the plow leaves so narrow a trench that the seeds are left in almost a single straight line, which is convenient for aftercultivation. The extending wings X in the rear hold open the furrow until the seed is actually deposited in place.

Fig. 12 shows another modification, which differs from the plow shown in Fig. 8 only in the shape of the furrowing-tooth $T^2$.

By means of the dovetail connection $T^3$, hereinbefore described, these plows are easily interchangeable and capable of peculiar and very perfect adjustment.

One important feature of my machine is that instead of having two driving-wheels there is only one, which is centrally placed and which has an integral hub-forming beveled gear, which actuates the driving-spindle H, having on its end a beveled gear. This necessarily throws the driving-spindle H to one side of the center line of the machine, and therefore its connections—to wit, paddle-box, paddle-wheel, and cam-wheel—are also off the center. By sloping the seed-channel, as shown in Fig. 4, the seed is brought back and deposited under the center of the machine in line with the driving-wheel, plow, coverers, and roller.

I claim—

1. In a hill-dropper, a hopper F provided with a cylindrical paddle-box G, having a discharge-opening $g'$ near its bottom and provided with a hip-roof cover $g$ integral with the hopper, substantially as described.

2. In a hill-dropper, a discharging-channel L in combination with the plow T having the teeth T' and $T^2$ and the dovetail $T^3$, substantially as described.

3. In a hill-dropper, an integral frame C having the hopper F, driving-wheel A, cam-wheel and paddle-operating offset spindle H, and handle $F^3$ provided with the cut-off-operating rod $R^2$ and bell-crank lever R in combination with the casting K having the obliquely-sloping seed-channel L, plow T, covering-blades S S and roller B, all arranged and operated substantially as described.

In witness whereof I have hereunto set my hand.

SAML. L. ALLEN.

Witnesses:
JAMES H. WOLFE,
JAS. H. W. ALTHOUSE.